Oct. 20, 1931.  A. E. GUSTAFSON  1,828,532
ELEVATING GRADER
Filed May 11, 1929  7 Sheets-Sheet 6

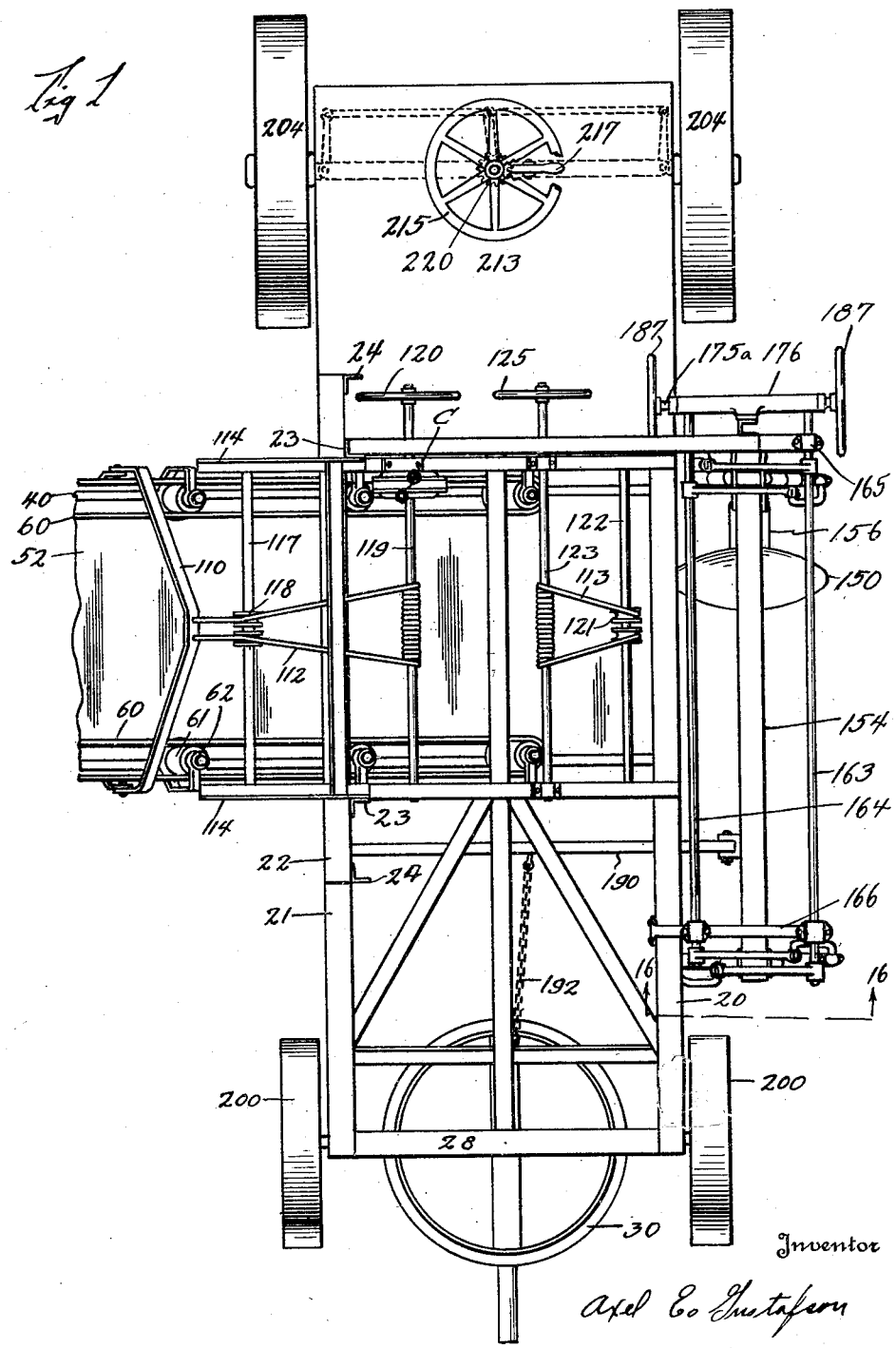

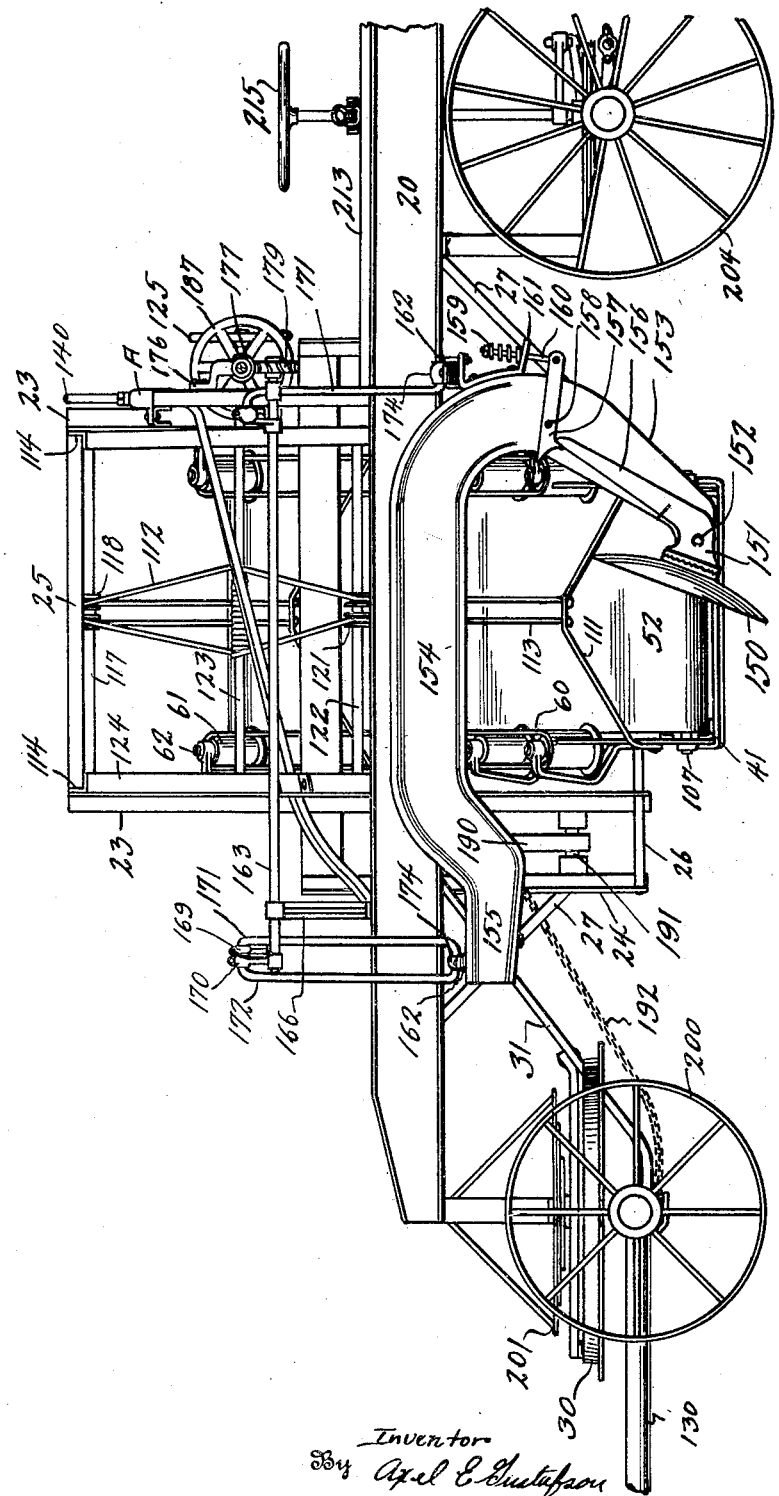

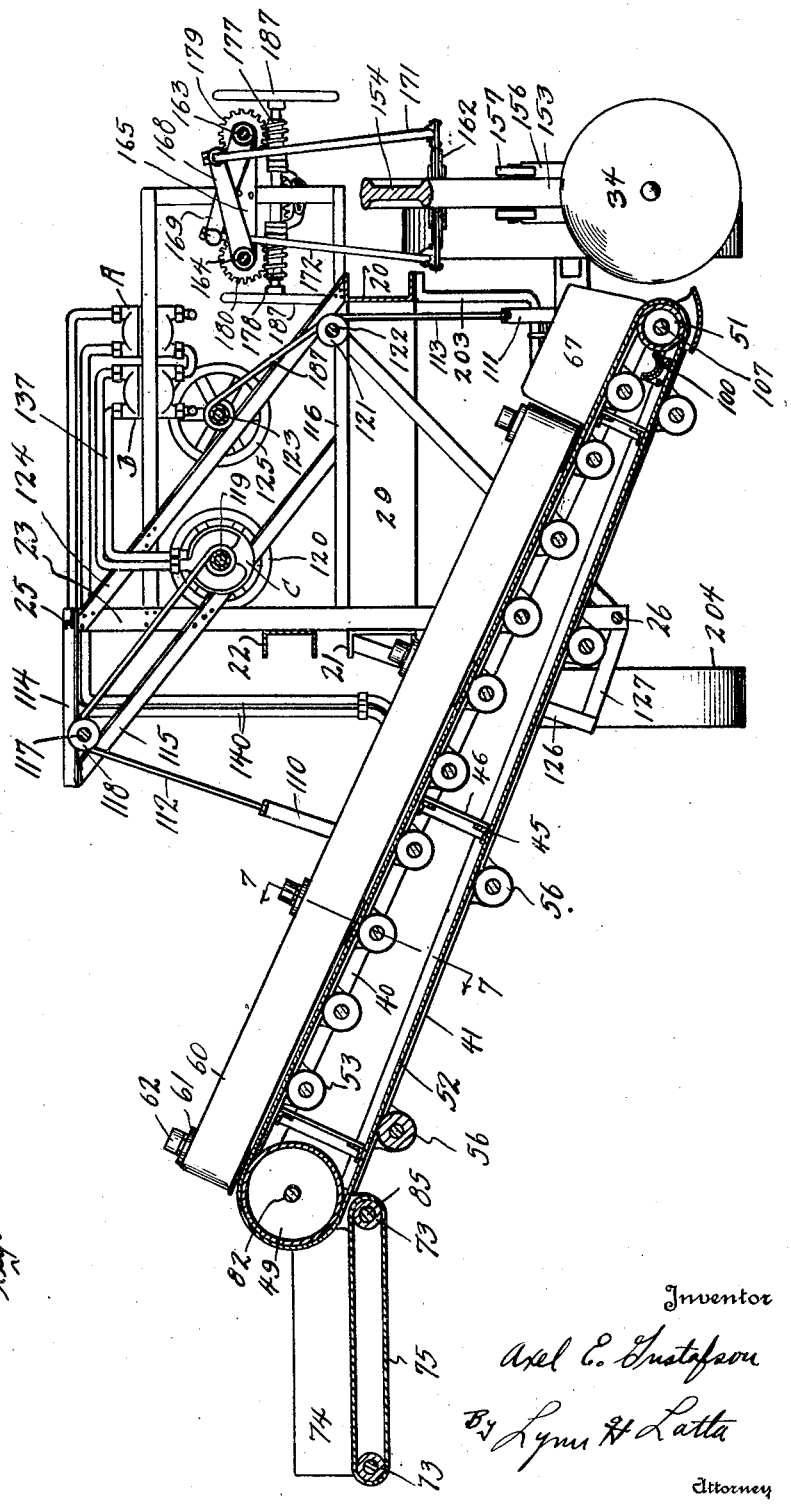

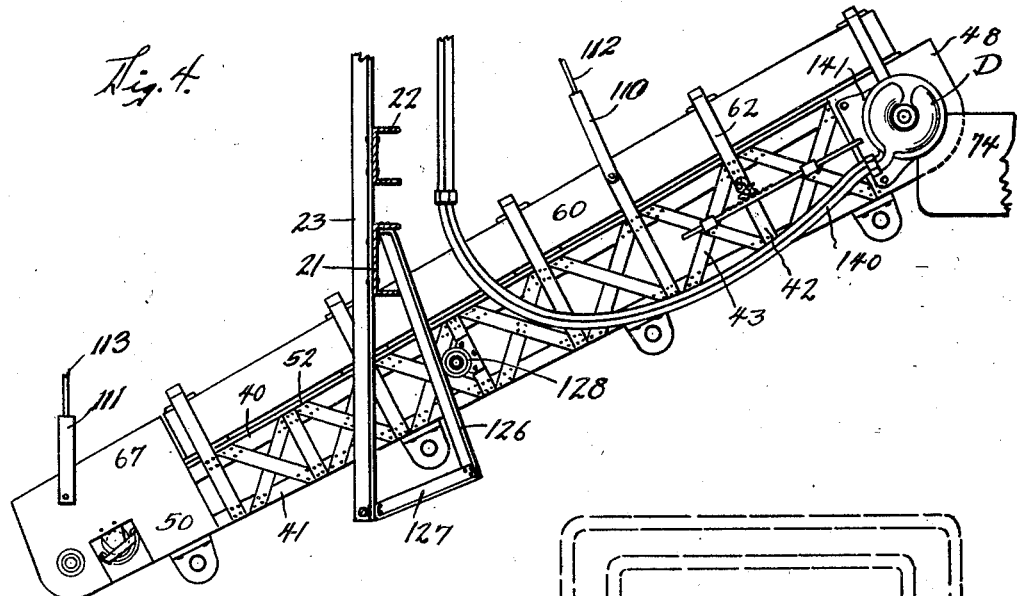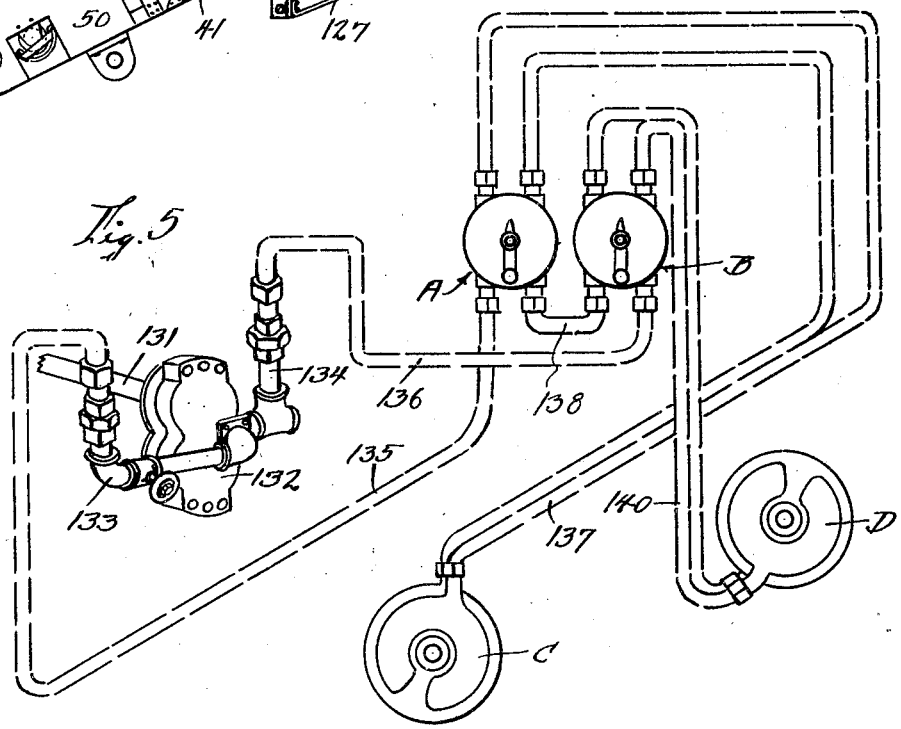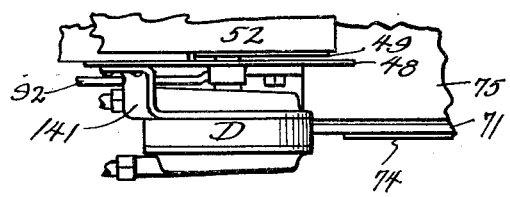

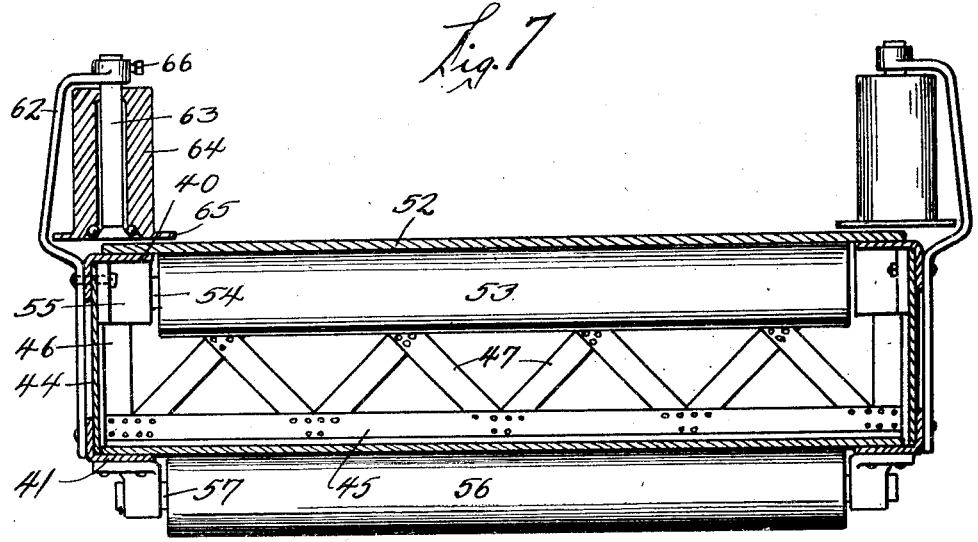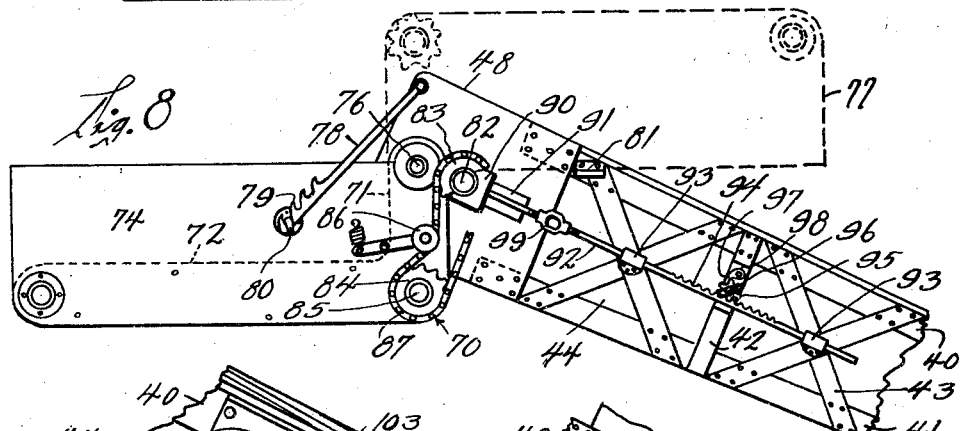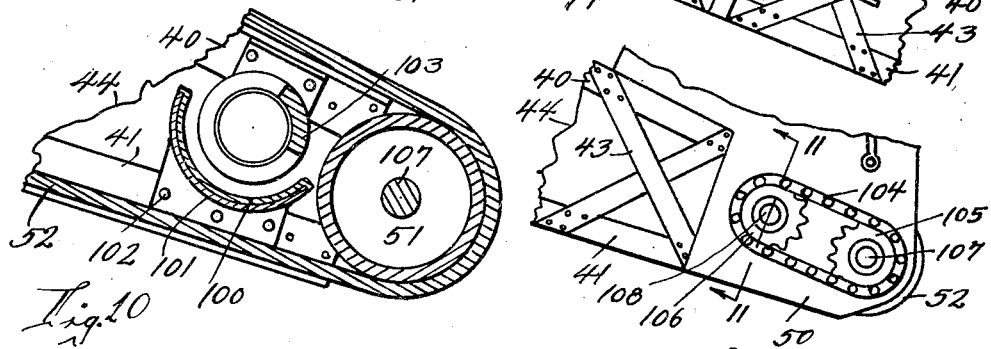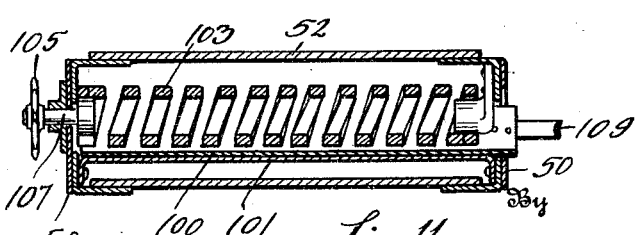

Inventor
Axel E. Gustafson
By Lynn H. Latta
Attorney

Inventor
Axel E. Gustafson
By Lynn H. Latta
Attorney

Patented Oct. 20, 1931

1,828,532

UNITED STATES PATENT OFFICE

AXEL EDWARD GUSTAFSON, OF SALEM, SOUTH DAKOTA

ELEVATING GRADER

Application filed May 11, 1929. Serial No. 362,287.

My invention relates to elevating road graders and has for its general object to improve upon present types of construction of elevating graders.

One object of my invention is to reduce the weight that is necessary in a grader of this type. It is my purpose to accomplish this by eliminating the gearing that ordinarily connects the carrier or elevator to the rear axle drive which is found in the ordinary elevating grader. This is made possible by applying a direct drive to the carrier at its upper end.

A further object of my invention is to obtain such a direct drive in a simple manner which will not add any very great expense to the cost of the grader and that will not complicate the operation of the grader. I find that this can be best accomplished by linking the direct drive with the tractor that is used to pull the grader and utilizing a portion of the power of the tractor. In order to connect the tractor with the carrier without interfering with the operation of the tractor and grader, it is necessary to have a flexible power transmitting medium.

My invention therefore comprises the use of a motor mounted directly on the carrier and preferably connected directly to the upper shaft of the carrier; a pump carried by the tractor and geared to the power take-off shaft of the tractor and a flexible power transmitting medium connecting the pump on the tractor with the motor on the carrier.

My invention has for another object to provide power means for raising and lowering the carrier. It is my purpose to this end to employ a second motor adapted to be energized from the same pump that supplies power for the carrier drive. In this regard my invention also contemplates control mechanism for switching either of the motors into or out of the fluid conducting line, whereby the operation of either can be controlled independently.

It will be understood that by eliminating the rear axle drive and the gearing connecting the rear axle drive and substituting a direct drive the draft strains which have hitherto been occasioned by the transmission of power to drive the carrier through the medium of the grader frame, the rear axle drive and the gearing are all eliminated and the only direct strains necessary are those occasioned by the plowing and pulling of the weight of the grader. It has been found that graders break down first in the cracking of the frame under the excessive strains set up under heavy load conditions. When it is remembered that the frame of an elevating grader is divided on one side to provide an arch for the reception of the carrier, it will be seen that the problems of strength in the frame are very material.

Another object of my invention is to provide an improved plow construction. In connection with the plow, one improvement aimed at in the present invention is the provision of means for lateral swinging of the plow while the grader is in action.

A further object is to provide means for accomplishing this lateral swinging very rapidly and with little effort on the part of the operator.

A further object is to provide means in which the mechanism for accomplishing the lateral swinging is a part of the mechanism for controlling the raising and lowering of the plow whereby the control mechanism is simplified as much as possible. In this connection it is my object to provide a control arrangement in which the plow can be swung laterally without any raising or lowering movement or can be raised vertically without lateral movement.

My invention further has for its object to provide such a control mechanism by means of which the plow may be forced into the ground under positive pressure if desired.

Another object of my invention is to provide such a control mechanism which is as nearly foolproof as possible. With respect to the plow, my invention further contemplates a construction in which a maximum clearance is provided beneath the plow beam without detracting from the proper controlling of the plow.

My invention further contemplates improving the rear axle construction of the grader so as to provide a better control for the rear end of the grader in working in ditches. To this end it is my object to provide means for adjusting the rear wheels toward the cut.

My invention also proposes to improve the carrier of an elevating grader of this type by eliminating the end to end twist that the belt of the carrier is frequently subjected to, owing to twisting strains in the frame caused by working on slopes. To this end it is my object to provide a carrier that has what I may term a floating support, whereby the carrier may hang by gravity on a level keel when the frame of the grader is tilted. In order to accomplish this, the direct drive and flexible connection already mentioned are necessary in order to eliminate connections between the carrier and the grader frame. Thus the object of the direct drive is not only to reduce strains on the frame of the grader but to reduce strains on the carrier frame as well.

A further object of the direct drive is to obtain a higher efficiency from the power output of the tractor by reducing friction losses to a minimum.

Returning to a consideration of the objects contemplated in improving the carrier, it is my purpose to obtain vertical and longitudinal movements in the carrier frame for adjusting it to different working positions in a novel and simple mechanism for supporting and controlling the carrier frame. It is also my purpose to build a rigid carrier frame having lightness and strength.

An object of my invention necessarily resulting from two objects already mentioned is the successful combining of vertical and longitudinal controls for the carrier with a floating carrier support.

Another object is to provide a carrier which may be lengthened or shortened in a much more simple manner than is now possible in existing types of elevating graders. This is accomplished by providing the carrier in a main integral section with a short extension hinged to the end of the main section in such a manner that it may be swung from inoperative to operative position or vice versa in the space of a minute's time.

A further object is to provide a simple, effective and rapidly operable apron tightening mechanism for the carrier.

Another object is to provide a carrier in which there are no open spaces between the apron and the frame of the carrier for the accumulation of dirt.

Another object is to provide an improved construction in which dirt will not accumulate between the apron and the carrier frame.

Another object is to provide a carrier construction in which the dirt is elevated with no frictional resistance between the dirt and the elevator. These last two objects are attained by substituting for the normal fixed sides of the carrier a pair of endless belts, the inner reaches of which travel in the same direction and together with the carrier belt.

Another object is to provide a carrier extension in which the working angle may be changed. In this connection it will be remembered that when the elevator is working in a ditch loading a wagon that the carrier will be tilted up at a sharp angle in order to clear the side of the wagon box and that in order to get the carrier over the center of the wagon the upper end will have to be positioned considerably above the wagon. With the use of my extension, the carrier may be brought above the edge of the wagon and the extension then extended horizontally to reach the center of the wagon.

It might be mentioned that it ordinarily takes a half day's work to put on the ordinary extension provided in existing types of elevating graders.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a plan view of the grader of my invention, parts of the carrier being omitted.

Fig. 2 is a right side elevation of the grader.

Fig. 3 is a transverse, sectional view taken centrally through the carrier of the grader and looking rearwardly.

Fig. 4 is a sectional view through a portion of the frame looking forwardly, the carrier being shown in side elevation.

Fig. 5 is a diagram showing the power connection between the tractor and the grader.

Fig. 6 is a detail, plan view of the motor for driving the carrier.

Fig. 7 is a transverse, sectional view taken through the carrier on the line 7—7 of Fig. 3.

Fig. 8 is a detail, elevation of the upper end of the carrier viewed from the side opposite to that of Fig. 4.

Fig. 9 is a detail elevation of the lower end of the carrier viewed from the same side as Fig. 8.

Fig. 10 is a sectional view taken longitudinally through the lower end of the carrier.

Fig. 11 is a transverse, sectional view taken on the line 11—11 of Fig. 9.

Figure 12:
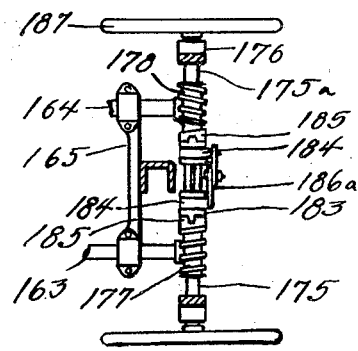
Fig. 12 is a detail, plan view of the operating end of the plow control mechanism.
Figure 13:
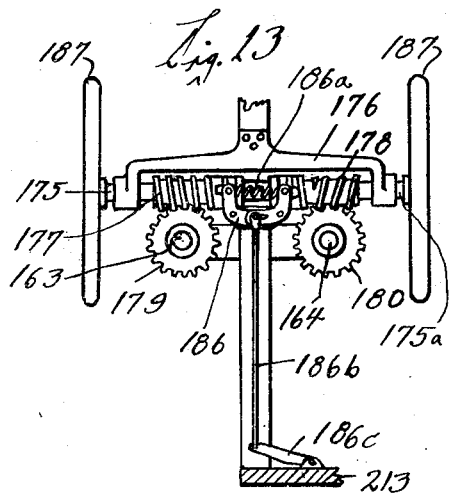
Fig. 13 is an elevation of the mechanism shown in Fig. 12, viewed from the right hand side of Fig. 12.

Before taking up in detail the improvements involved in my invention, I wish to refer in a general way to the features of construction which follow those of the present type of elevating grader. The general structure of the grader illustrated is designed along lines similar to the Russell grader with the exception that the frame of the grader is made considerably lighter throughout.

I have used the reference characters 20 and 21 to indicate the two main side rails of the grader frame. The rail 21 is formed in two separated portions which are connected by an arch rail 22, considerably higher than the rail 21 and connected to the rail 21 sections 21 by upright arch posts 23 and bracing posts 24. The posts 23 are connected at their upper ends by an arch beam 25 and at their lower ends by a strut 26. The usual braces 27 serve to rigidify the arch structure and the left hand frame construction.

The purpose of the arch just described is to receive the carrier which is shown completely, in section, in Fig. 3. Sufficient clearance must be provided to allow the carrier to swing vertically.

Rails 20 and 21 are connected at their ends by forward and rear cross members 28 and 29, respectively (see Figs. 1 and 3, respectively).

Figure 17:
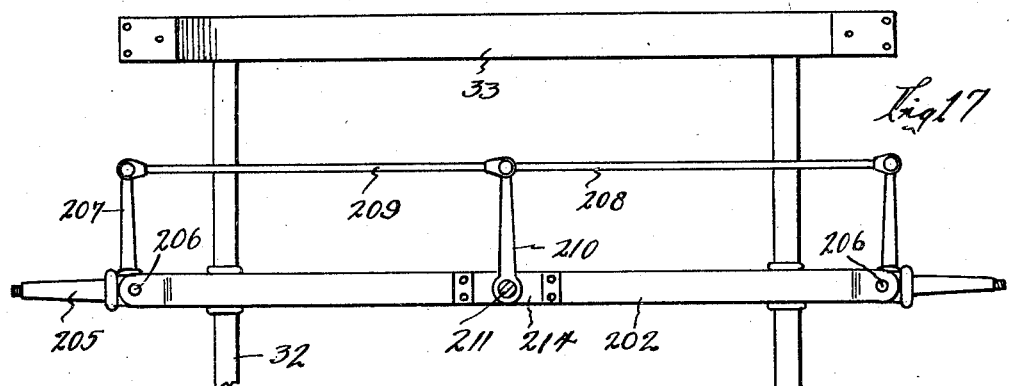
Fig. 17 is a plan view of the rear axle mounting, the grader frame being not illustrated.
Figure 18:
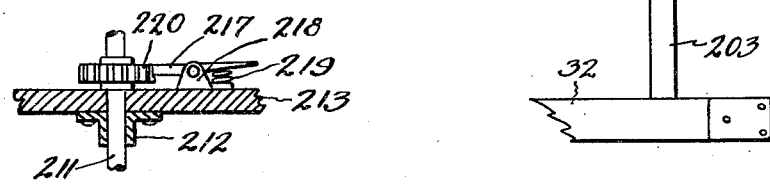
Fig. 18 is a detail, sectional view of the rear wheel steering lock.
Figure 19:
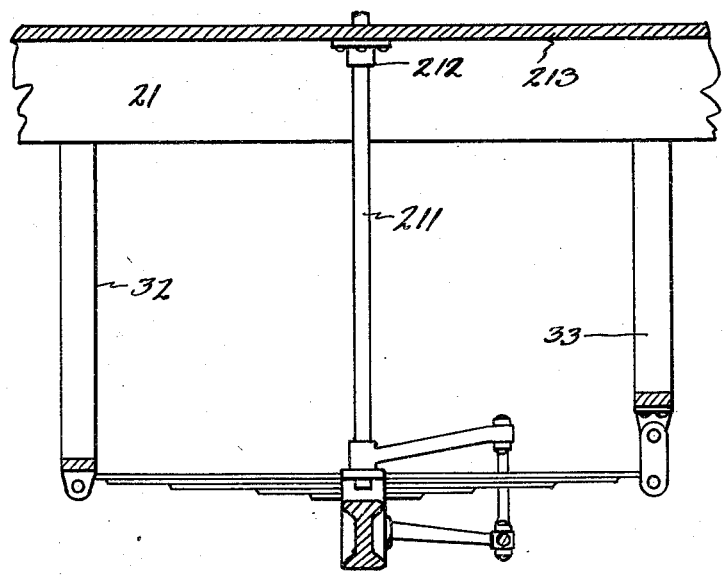
Fig. 19 is a sectional view taken longitudinally through the rear axle assembly.

The usual front wheel mounting, including the fifth wheel construction 30, suitably secured to the cross member 28 and braced as at 31, is provided for the front wheel assembly. The usual rear axle brackets 32 and 33 are provided in the form of yokes extending transversely of the frame and spaced apart (see Figs. 17 and 19).

Instead of the usual method of connecting the axles to their respective mountings, I provide spring mountings which will be hereinafter described more in detail.

The carrier is positioned in the same relation to the grader frame as in the present type of grader and the plow 34 is positioned normally in the same relation to the carrier.

The above features are features that are old in present types of graders.

My invention contemplates the various changes given in the objects already set forth and in further objects to be developed herein and one of these improvements is the

*Carrier construction*

Reference to Figs. 7 and 8 shows that the carrier frame comprises two pairs of angle irons 40 and 41, respectively, the angle irons 40 and 41 of each pair being connected by transverse struts 42 and diagonal braces 43 secured to the outer faces of their side flanges and plates 44 of relatively thin sheet material secured to the inner faces of the same flanges to form a pair of reinforced, substantially channel shaped, side girders.

These side girders are connected by cross girders each comprising a pair of angle iron cross members 45, secured to end struts 46 and braced by diagonal open work bracing 47. The struts 46 are secured to the side flanges of the angle irons 40 and 41 by securing members extending through the plates 44.

To the upper ends of the angle irons 40 and 41 are secured a pair of upper end plates 48, between which is mounted the upper apron roller 49. (See Figs. 8 and 3.)

To the lower ends of the angle irons 40 and 41 are secured a pair of lower end plates 50, between which is mounted a lower apron roller and the catch trough construction which will be hereinafter described in detail.

An endless apron 52 travels over the rollers 51 and 49 and the rollers are so positioned that the upper reach of the apron travels upon and overlaps the top flanges of the upper angle iron members 40 while the lower reach of the apron travels upon the bottom flanges of the lower angle iron 41 (see Fig. 7).

The upper angle irons terminate short of the axes of the apron rollers 48 and 51 so that the plane of their upper surfaces may be tangent to the rollers.

The intermediate region of the upper reach of the apron is carried upon a set of spaced idler rollers 53, the shafts 54 of which are journalled in bearings 55 on the side flanges of the upper angle irons 40, as shown in Fig. 7.

It will now be seen that the apron is so related to the frame of the carrier that no cracks are formed between the frame and the apron. Thus the possibility of bits of gravel, débris, and the like becoming wedged between the apron and the frame is guarded against. This is accomplished in an open work construction having maximum strength and minimum weight and yet comparatively simple in arrangement. The use of the end plates provides protective covering for the rollers at their ends, makes it possible to terminate the upper angle iron, longitudinal frame members short of the rollers so as to allow the apron to travel over the angle iron members and simplifies the construction of the apron adjusting mechanism and the catch trough arrangement to be hereinafter described.

*Carrier side belts*

In the usual carrier construction, stationary side members are provided to form together with the traveling apron a trough. My invention contemplates the use of a pair of endless belts 60, traveling around a series of rollers 61, mounted as shown in Fig. 7 of the drawings.

Alternate struts 42 are continued upwardly substantially in the shape shown in Fig. 7 to form belt roller brackets 62, which support stub shafts 63, on which are journalled belt roller 64, having belt supporting flanges 65.

The stub shafts 63 may be adjusted toward the apron 52 by loosening the set screws 66, which secure the stub shafts in the brackets 62. Normally the rollers are adjusted as close to the apron as possible without causing friction against the apron so as to allow the side belts 60 to travel with their edges near to the upper surface of the apron. It will be noted that the inner reaches of the belt 60 overlap the edges of the apron. The apron and the belts may travel at substantially the same linear speed and thus there will be no tendency for particles of gravel and the like to work between the apron and the belts. Thus the belts cooperate with the rest of the carrier construction in guarding against the filtering of foreign material between the apron and the frame and the operation of the carrier is thus rendered much more efficient and requires less power.

The aprons terminate short of the lower end of the carrier and the lower end plates 50 are projected upwardly as at 67 to form protecting abutments for the lower ends of the belts where the material is being thrown forcefully into the carrier from the plow 34.

Carrier extension

The present type of carrier extension must be bolted to the carrier and in order to install it, it is necessary to remove the upper roller, add a piece to the apron and replace the roller in the end of the extension.

The ordinary extension can be secured in only one position relative to the carrier. When casting up earth from a ditch into the wagon in the center of a road, the angle of the carrier will be relatively steep and in order to bring the end of the carrier over the center of the wagon and yet clear the side of the wagon, the end of the carrier must be positioned at a considerable height above the wagon. This requires extra power to elevate the dirt the added distance above the wagon and makes it more difficult to accurately deposit the material in the wagon.

My invention contemplates an extension that will answer all of these difficulties in a simple manner. The extension comprises simply a frame composed of a pair of L shaped frame members 70, having the short arms 71 and the long arms 72, a pair of rollers 73 journalled in the arms 72, a pair of side members 74 secured to the arms 72 and an endless extension apron 75 traveling upon the rollers 73.

The short arms 71 are hinged to the carrier frame by means of suitable studs or bolts 76, carried by the plates 48 and the hinge axis is positioned slightly above the axis of the upper roller 49 so that when the extension is swung upwardly to the position shown in dotted lines at 77 in Fig. 8, a space will be left between the inner end of the apron 75 and the apron 52 so that material may pass under the extension apron. When the extension is in its extreme lowered position as shown in full lines in Fig. 8, the extension apron runs very close to the apron 52.

The extension is supported in any of several different angular positions relative to the carrier by means of a bar 78, provided with a plurality of hooks 79, adapted to engage hooks 80, secured to the side members 74 of the extension, the bars 78 may be unhooked and allowed to swing free of the extension when it is desired to move the extension to the position shown in dotted lines and the edges of the extension are adapted to rest against brackets 81 on the carrier frame when the extension is in inoperative position.

The shaft 82 of the upper apron roller 49 is provided with a sprocket 83, which is aligned with a sprocket 84 on the shaft 85 of the inner extension roller 73. A spring urged idler roller 86 maintains the chain 87, which travels between the sprockets 83 and 84 taut during the several positions of adjustment of the extension.

It will now be seen that by slipping off the chain 87, the extension may be instantly moved to inoperative position, where the carrier may function normally to deliver material from its end. When additional length is desired, the extension may be quickly adjusted to any of the several angular positions that may be desired for forming a prolongation of the carrier. When casting up a steep angle, as hereinbefore described, the extension will be lowered to its extreme lower position in order that it may project substantially horizontally over the edge of the wagon under which the casting is being done. Thus the additional length required for spanning the wagon is obtained without the necessity of elevating the material substantially above the wagon.

Carrier apron adjustment

The purpose of the particular apron adjustment is to provide quickly operable means for tightening the apron. This is accomplished by mounting the bearings 90 of the upper apron roller shaft 82 for sliding movement in slots 91 in the plates 48.

The adjustment of the bearings is accomplished by a rod 92, slidably mounted in bearings 93, secured to the carrier frame and including a rack 94, operated by a pinion 95, provided with a squared shank 96 to receive a crank and locked by a pawl 97. The pinion 95 and pawl 97 are mounted on a bracket 98, carried by the carrier frame.

A turn buckle 99 is included in the rod 92 for fine adjustments. The pinion 95 is used for rapid adjustment.

Catch trough construction

The catch trough 100 (Fig. 10) employed for the purpose of protecting the lower reach of the belt from the drippings from the roller 51 and the upper reach of the belt, is slidably mounted in a trough supporting channel 101, secured as at 102 to the side flanges of the lower angle bars 41. The usual screw conveyor 103 is employed for moving the material from the trough 100 and discharging it exteriorly of the carrier and is driven by a chain 104, traveling on sprockets 105 and 106, respectively, on the shafts 107 and 108, respectively, of the lower apron roller 51 and the conveyor 103, respectively.

The novel feature of the catch trough in the present invention lies in the construction whereby the trough may be removed for cleaning. It will be noted, referring to Figs. 11 and 4, that the lower end plate 50 on the side of the carrier opposite the catch trough conveyor drive 104 is cut away to provide an opening through which the catch trough 100 may be removed longitudinally. A handle 109 may be provided for the convenience of the operator in grasping the trough.

The importance of this feature of my invention will be very apparent to anyone who has had any experience with an elevating grader. The spiral conveyor is intended to move the material from the trough but usually where there is any dampness whatever in the material being worked in, the drippings from the lower end of the belt will gradually fill the space between the catch trough and the conveyor and it becomes packed in so tightly that the conveyor cannot function. When this occurs, the material will begin to filter beneath the apron and ultimately it will form a layer on the roller that will hold the apron away from smooth contact with the roller and will ultimately stretch the apron out of shape.

Careful operators clean out the catch trough periodically but this is a very laborious job and requires considerable time. By providing the removable catch trough construction, the cleaning operation requires but a minute. The trough is simply pulled longitudinally from its place in the carrier, is inverted and knocked clear of the accumulated sediment and is then replaced without disturbing whatever the relation of the conveyor to its associated parts.

Carrier mounting

In the ordinary elevating grader, the carrier is hinged to the grader on a rigid hinge axis such that the lower end of the carrier must follow the inclination of the grader frame. For instance, if the grader is traveling up a sharp incline or climbing from a ditch, the axis of the lower roller or the hinge axis of the lower end of the carrier will be tilted from the horizontal to follow the inclination of the grader. At the same time, the upper extremity of the carrier is supported by a hanging yoke or the like, thereby tending to seek a position directly below the rigid support from which it is hung instead of tilting sideways to follow the inclination of its lower end.

It will be readily seen that the result of this combination of forces is to twist the carrier longitudinally, the lower end being tilted from the horizontal and the upper end tending to seek the horizontal. In a heavily loaded carrier, this twisting action is very detrimental, tending to cause the apron to travel with difficulty, wearing the apron much more rapidly than it should and loosening and weakening the frame of the carrier.

In my invention, this difficulty is overcome by the use of what I may term a floating carrier mounting, in which both upper and lower ends of the carrier are hung so that they may swing laterally to maintain horizontal positions.

Referring now to Fig. 4, which is intended to illustrate the carrier mounting, together with Fig. 3, which shows the overhead supports, the mounting comprises an inner yoke 111, secured to the lower end plates 50, an outer yoke 110, secured to the carrier frame intermediate its ends and suspending cables 113 and 112, connected to the respective yokes.

The main frame of the grader includes a pair of horizontal, laterally projecting arms 114, secured to the upper ends of the posts 23 and projecting beyond the side of the grader, a pair of lower, diagonal braces 115, secured to the post 23 and to the outer ends of the arms 114 and two cross frame members 116, extending between the rails 20 and 21 of the main frame of the grader. Supported from the arms 114, is a shaft 117, on which are mounted a pair of sheaves 118, over which the cables 112 travel. A windlass shaft 119 is journalled in brackets supported by the diagonal braces 115 and the cables 112 are wrapped around the shaft 119. The usual hand wheel 120 is provided for operating manually the windlass shaft 119.

It will be noted that the sheaves 118 are positioned very closely together, whereby the carrier swings from what is substantially a point.

The cables 113 travel over sheaves 121, mounted on a shaft 122, carried between the cross members 116 and are wrapped about a windlass shaft 123, journalled in suitable brackets on a pair of second diagonal braces 124, connected between the cross members 116 and the upper ends of the posts 23. The hand wheel 125 is used to operate the windlass shaft 123. The sheaves 121 are positioned very closely together (see Fig. 2) so that the lower end of the carrier swings from what is substantially a point.

The carrier is supported against longitudinal movement toward its lower end by the guide rails 126, secured to the frame rail 21 and to struts 127 and rollers 128, journalled upon the sides of the carrier, frame and traveling against the rails 126. The rollers 128 may move somewhat laterally relative to the rails 126, as the carrier swings laterally in adjusting itself to the tilting of the grader. The weight of the carrier will maintain the rollers 128 at all times in engagement with the rails 126 and thus the longitudinal positioning of the carrier is assured. The rails 126 are inclined as shown.

Carrier drive

The general features of the carrier drive have already been rather fully set forth in the objects of invention. The tractor which pulls the grader is not illustrated in the drawings but it will be understood that the grader is hitched to the tractor through the medium of a tongue 130. The power take-off shaft of the tractor is shown at 131 of Fig. 5. A popular type of fluid pump is illustrated at 132 in Fig. 5 and has the delivery pipe 133 and return pipe 134, connected through the medium of flexible tubes 135 and 136 to the intake and return ports, respectively, of a pair of control valves A and B, each of which is similar in construction to the valve shown and described in my co-pending application, Serial No. 356,843 filed April 20th, 1929, for a fluid motor. The flexible tubes 135 and 136 connect between the tractor and the grader in such a way as to allow full swinging movement of the grader relative to the tractor without interfering with the drive. The delivery ports of the valve A are connected by pipes 137 to a fluid motor C, which is operatively connected to the windlass shaft 119. The windlass shaft 119 may be either power operated or hand operated at the selection of the operator.

Valves 138 and 139 control the passage of fluid to the valves A and B. By closing the valve 138 and opening the valve 139, the fluid will be delivered to the valve B and by reversing the valves 138 and 139, the fluid will be delivered to the valve A.

When the motor C is in operation, the fluid will travel through the valve A to the motor, thence back through the valve to the return 136 and back to the pump. This will be apparent from an inspection of the construction of the valve and motor shown in the drawings in my co-pending application. When it is desired to raise the carrier by power, the motor is driven in one direction by setting the valve in the proper position and when it is desired to lower the carrier, the motor is driven in the reverse direction by reversing the valve according to the disclosure of my co-pending application.

The delivery ports of the valve B are connected by pipes 140 to a fluid motor D, which is connected to the shaft of the upper apron roller 49. A bracket 141 is used to mount the motor D on the carrier frame, as shown in Fig. 6.

The motor C is mounted upon the diagonal brace 115, as shown in Fig. 3. While the motor D is operating, the fluid will pass from the valve B to the motor and thence back through the valve and the pipes 135 and thence back to the pump.

Plow mounting

Referring now to Figs. 1 and 2, the usual plow 150 is adjustably secured to a bracket 151, pivoted at 152 to the lower end of the plow beam 153. The beam 153 is arched as at 154 to provide a maximum clearance for the earth passing beneath it. The forward end is extended downwardly as at 155 to bring the level of support below the arch of the beam.

The bracket 151 has a pair of arms 156, which are engaged at their upper ends by a pair of latch bars 157, pivoted at 158 to the plow beam and urged against the arms 156 by springs 159 acting between links 160, connected to the latching arms 157 and the bracket 161.

The bracket 161 also serves to support a spring 162, which has arms projecting on either side of the beam 153 and which connects the beam to the control mechanism.

The supporting and controlling mechanism comprises a pair of parallel shafts 163 and 164, journalled in brackets 165 and 166 and brackets 166 and 167, respectively, a pair of arms 168 and 169 secured to the respective shafts at one end, an arm 170 secured to the shaft 163, at its other end a pair of links 171 and 172. respectively, connecting the arms 168 and 169, respectively, to the ends of the spring arm 162 and a link 173 connecting the arm 170 to the forward end 155 of the beam.

Ball and socket connections 174 are employed for connecting the links to the arms and to the beam as shown.

It will now be seen that by rotating the shafts 163 and 164 simultaneously in the same direction, the arms 168, 169 and 170 will be simultaneously raised, raising the beam vertically. By raising or depressing the arm 172 while the arms 171 and 173 remain stationary vertically, the beam will be swung, respectively, in directions toward or from the grader frame. This is thought to be evident from the construction illustrated.

In order to accomplish the independent control of the arm 172, I provide a worm shaft 175, mounted in a bearing bracket 176, transversely of the shafts 163 and 164 and provided with a pair of worms 177 and 178, meshing with worm wheels 179 and 180 (Fig. 3) on the shafts 163 and 164, respectively.

The worms 177 and 178 are loosely mounted on the shaft 175 and held against longitudinal movement by collars 182. A clutch collar 183 is slidably splined upon the shaft 175 and has clutch elements 184, adapted to co-act with clutch elements 185 on the worms 177 and 178. A clutch fork 186, mounted on the bracket 167, controls the movement of the clutch collar 183.

It will now be seen that when the clutch is moved to enclutch the worm 177 that rotation of the hand wheel 187 will cause the shaft 163 to be rotated, that when the worm 178 is enclutched and that the shaft 164 will be rotated alone upon rotation of the hand wheel.

Figure 14:
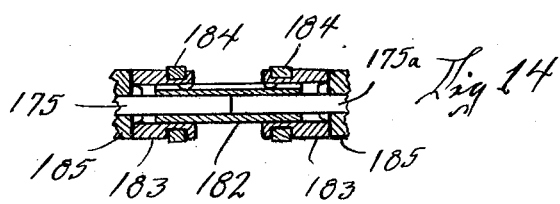
Fig. 14 is a detail, sectional view through one of the clutch elements of the plow control mechanism.

The arm 170 is a spring arm, as shown in Fig. 14, and is connected to the shaft 163 by a squared socket 189 into which the squared end of the shaft 163 projects.

Figure 15:
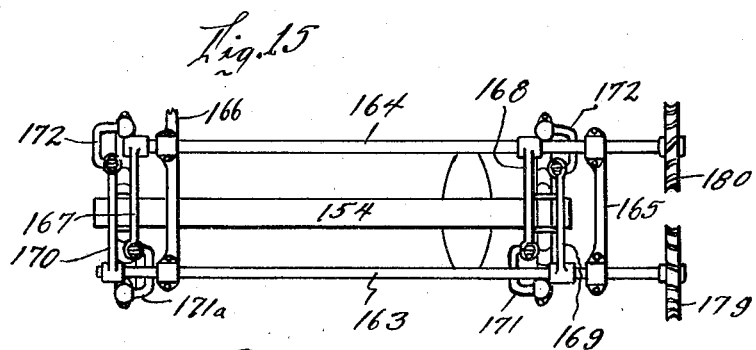
Fig. 15 is a plan view of the control mechanism.
Figure 16:
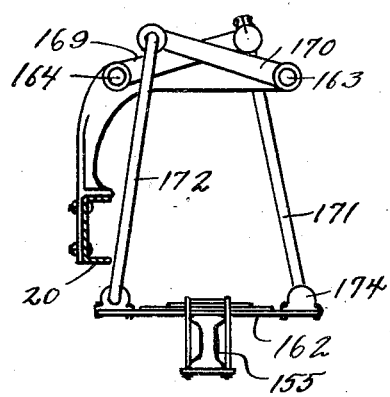
Fig. 16 is a sectional view taken on the line 16—16 of Fig. 1.

A modified form of the control mechanism is shown in Figs. 15 and 16. The hand wheel worm and clutch mechanism is the same but the shafts 163 and 164a are made both the full length of the plow beam. Instead of a single arm to support the front end of the plow beam, a pair of arms 170a and 170b are provided, the same as the arms 169a and 168a at the other ends of the shafts.

Another difference in the modified construction is the extending the arms toward each other instead of in the same direction and connecting them to opposite ends of the plow springs from the shafts on which they are mounted. The advantage in this type of construction arises from the fact that the angle of the links 171a and 172a can be made the same in this form and less space is utilized.

The usual drag beam 190 is connected between the beam 153 and a pivotal mounting 191 at the other side of the frame of the grader and the usual pull chain 192 is hinged between the drag beam 190 and the front axle clevice.

Wheel mountings

The front wheels 200 are connected to the fifth wheel 30 in the usual manner, the fifth wheel 30 being supported from the frame through the medium of the springs 201.

The rear wheel mounting includes the axle 202 connected to the yokes 32 and 33 by the springs 203. Thus the grader is entirely spring mounted.

Rear wheel guide

The rear wheels 204 are mounted on steerable stub axles 205, which are connected to the axle 202 by the steering knuckles 206. Steering arms 207 are connected together by a drag link 208 and by a steering link 209 to a steering arm 210, which is mounted on a steering shaft 211. The steering shaft 211 is journalled in a bearing 212, carried by the platform 213 and in a bracket 214 on the axle 202 (see Figs. 19 and 17, respectively).

A steering wheel 215 is secured to the upper end of the shaft (Fig. 1).

The steering shaft 211 may be locked in any position by a locking pawl 217, fulcrumed in the bracket 218 on the platform 213 and urged by a spring 219 into engagement with a pinion 220 on the shaft 211. By stepping upon the end of the pawl 217, the pinion may be released to allow a steering wheel to be turned.

The advantage of steering the rear wheels arises from the tendency of the rear end of the grader to slide downwardly when working on a sharp slope such as in a ditch. By turning the wheels upwardly of the slope, this tendency of the grader to slide downwardly may be counteracted by the climbing action of the rear wheels.

Some changes may be made in the construction and arrangement of the parts of my invention without departing from the real spirit and purpose of my invention, and it is my invention to cover by my claims, any modified forms of structure or use of mechanical equivalents, which may be reasonably included within their scope.

I claim as my invention:

1. In an elevating grader, a grader frame, a plow beam, a pair of shafts journalled in the frame above and parallel to the beam, a cross arm secured to the plow beam near its rear extremity, a pair of support arms secured to the shafts and extending laterally therefrom, a pair of links connecting said support arms to the cross arm at points disposed on either side of the beam, a forward support arm secured to one of the shafts above the forward region of the beam, a link connecting said forward support arm to the beam near its forward end, and means to rotate the shafts in unison, or to rotate one of the shafts by itself.

2. In an elevating grader, a grader frame, a plow beam, a pair of shafts journalled in the frame above and parallel to the beam, a cross arm secured to the plow beam near its rear extremity, a pair of support arms secured to the shafts and extending laterally therefrom, a pair of links connecting said support arms to the cross arm at points disposed on either side of the beam, a forward support arm secured to one of the shafts above the forward region of the beam, a link connecting said forward support arm to the beam near its forward end, and means to rotate the shafts in unison, or to rotate one of the shafts by itself, comprising a worm shaft journalled in the frame transversely of the supporting shafts, a pair of worm wheels on the supporting shafts, worms on the worm shaft, meshing with said worm wheels, one of the worms being loosely mounted on the shaft, and a clutch for connecting said last worm to the shaft.

3. In an elevating grader, a grader frame, a plow beam, a pair of shafts journalled to the frame above and parallel to the beam, support arms secured to the respective shafts and extending laterally near the rear region of the plow beam, a pair of links connecting said support arms to the beam at points spaced laterally on either side thereof, a forward support arm secured to one of the shafts and extending laterally near the forward end of the beam, a link connecting said forward support arm to the beam near its forward end and means to rotate the shafts in unison or to rotate one of the shafts by itself.

4. In an elevating grader, a grader frame, a plow beam, a pair of shafts journalled to the frame above and parallel to the beam, support arms secured to the respective shafts and extending laterally near the rear region of the plow beam, a pair of links connecting said support arms to the beam at points spaced laterally on either side thereof, a forward support arm secured to one of the shafts and extending laterally near the forward end of the beam, a link connecting said forward support arm to the beam near its forward end and means to rotate the shafts in unison or to rotate one of the shafts by itself, comprising a worm shaft journalled in the frame transversely of the supporting shafts, a pair of worm wheels on the supporting shafts, worms on the worm shaft, meshing with said worm wheels, one of the worms being loosely mounted on the shaft, and a clutch for connecting said last worm to the shaft.

Signed this 24th day of April, 1929, in the county of McCook and State of South Dakota.

AXEL EDWARD GUSTAFSON.